3,322,829
DIPHENETHYLBENZENE TETRACARBOXAMIDES
Ferdinand B. Zienty, Warson Woods, and Myron J. Holm, Olivette, Mo., assignors to Monsanto Company, St. Louis, Mo., a corporation of Delaware
No Drawing. Original application June 5, 1964, Ser. No. 373,065. Divided and this application Mar. 24, 1966, Ser. No. 537,020
3 Claims. (Cl. 260—558)

The present application is a division of our copending application Ser. No. 373,065, filed June 5, 1964, which in turn is a continuation-in-part of application Ser. No. 170,807, filed Feb. 2, 1962, and now abandoned.

This invention relates to new chemical compounds and particularly to diphenethylbenzene tetracarboxamides. These compounds which exhibit utility as synthetic resin intermediates are characterized by the following structural formula:

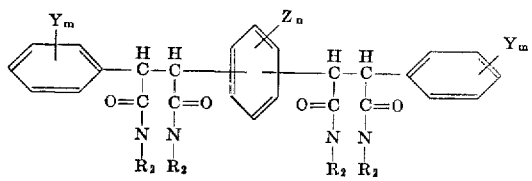

with R being selected from the group consisting of alkyl, alkenyl, cycloalkyl, monocarbocyclic aryl and monocarbocyclic aralkyl radicals each having from 1 to 18 carbon atoms, and hydrogen, Y is a monovalent substituent selected from the group consisting of alkyl, monocarbocyclic aryl and monocarbocyclic aryloxy radicals, alkoxy radicals containing from 1 to 18 carbon atoms, nitro radicals, halogens and secondary and tertiary amino radicals, Z is a monovalent substituent selected from the group consisting of methyl radicals and halogens, $m$ is a cardinal number from 0 to 5, inclusive, and $n$ is a cardinal number from 0 to 4 inclusive.

Tetracyanodiphenethylbenzene, the parent compound of the present group, can be prepared by the condensation of a benzenediacetonitrile with a benzaldehyde to form dibenzylidenebenzenediacetonitrile followed by cyanation of the dibenzylidenebenzenediacetonitrile. The condensation and cyanation can be conducted in a one-step operation, or the introduction of the additional nitrile groups can be deferred until the condensation is complete. The tetracyanodiphenethylbenzene thus obtained can be partially hydrolized to the corresponding tetracarboxamide hydrolyzed to the tetracarboxylic acid of diphenethylbenzene, and further reacted with thionyl chloride to form the corresponding tetracarbonyl chloride. The chloride is then reacted with an amine to obtain a desired tetracarboxamide.

As indicated above, benzaldehyde can be used in the preparation of the present invention. However, in the preparation of compounds having substituents on the terminal benzene rings, it is preferred to use substituted benzaldehydes rather than to add the substituents after the condensation reaction. Specific examples of substituted benzaldehydes that can be employed include methylbenzaldehydes, ethylbenzaldehydes, propylbenzaldehydes, butylbenzaldehydes, decylbenzaldehydes, dodecylbenzaldehydes, octylbenzaldehydes, methoxybenzaldehydes, ethoxybenzaldehydes, propoxybenzaldehydes, butoxybenzaldehydes, nonoxybenzaldehydes, undecoxybenzaldehydes, octadecoxybenzaldehydes, phenylbenzaldehydes, tolylbenzaldehydes, phenoxybenzaldehydes, toloxybenzaldehydes, nitrobenzaldehydes, chlorobenzaldehydes, fluorobenzaldehydes, bromobenzaldehydes, iodobenzaldehydes, nitrohalobenzaldehydes, alkylhalobenzaldehydes, alkoxyhalobenzaldehydes, aroxyhalobenzaldehydes, alkylnitrobenzaldehydes, alkylnitrohalobenzaldehydes and the like. The substituents on the benzaldehyde nucleus can vary in number from one through five, be like or unlike, and members of the groups indicated hereinbefore.

The benzenediacetonitrile to be condensed with the benzaldehyde may be ortho, meta or para, substituted or unsubstituted. Suitable benzenediacetonitrile include mono-, di-, tri- and tetra-methylbenzenediacetonitriles, mono-, di-, tri- and tetra-chlorobenzenediacetonitriles, mono-, di-, tri- and tetra-fluorobenzenediacetonitriles, mono-, di-, tri- and tetra-bromobenzenediacetonitriles, and mono-, di-, tri- and tetra-iodobenzenediacetonitriles. Mixed halobenzenediacetonitriles and methylhalobenzenediacetonitriles may also be employed. Examples of suitable benzenediacetonitriles of these groups include chlorofluoro-, chlorobromo-, chloroiido-, fluorobromo-, fluoroiodo-, bromochloro-, bromoiodo-, chlorobromoiodo-, methylchloro-, methylfluoro-, methyliodo-, methylbromobenzenediacetonitriles and the like.

As indicated above, R in the foregoing formula can be hydrogen or a hydrocarbon group containing from one to eighteen carbon atoms. Representative alkyl groups include methyl, ethyl, propyl, butyl, pentyl, hexyl, heptyl, octyl, nonyl, decyl, hendecyl, dodecyl, tridecyl, tetradecyl, pentadecyl, hexadecyl, heptadecyl, octadecyl and the like. Suitable alkenyl groups include, for example, vinyl, alkyl, propenyl, butenyl, pentenyl, hexenyl, heptenyl, octenyl, nonenyl, decenyl, hendecenyl, dodecenyl, tridecenyl, tetradecenyl, pentadecenyl, hexadecenyl, heptadecenyl, octadecenyl and the like. Alkenyl groups containing more than one double bond are also suitable. Cycloalkyl groups represented by R include cyclopropyl, cyclobutyl, cyclopentyl, cyclohexyl, cycloheptyl, cyclooctyl and the like. The cycloalkyl groups can have one or more hydrocarbon side chains to provide substituted cycloalkyl groups containing as many as eighteen carbon atoms. Aryl groups represented by R include phenyl, tolyl, xylyl, ethylphenyl, propylphenyl, butylphenyl, pentylphenyl, hexylphenyl, heptylphenyl, octylphenyl, nonylphenyl, decylphenyl, hendecylphenyl, dodecylphenyl and the like. Thus, the aryl groups can have one or more alkyl substituents containing a maximum of twelve carbon atoms. Representative monocyclic aralkyl or alphyl groups designated by R include benzyl, phenylethyl, phenylpropyl, phenylbutyl, phenylpentyl, phenylhexyl, phenylheptyl, phenyloctyl, phenylnonyl, phenyldecyl, phenylhendecyl, phenyldodecyl, xylylethyl and the like. While it is preferred that all of the above hydrocarbon groups are unsubstituted, they can have nitro groups or halogens. Also, the hydrocarbon chains can be either straight or branched.

The invention will be further clarified by reference to the following detailed descriptions of the preparation of compounds encompassed thereby. Unless otherwise specified, all proportions in these examples and throughout the specification are expressed in parts by weight.

EXAMPLE 1 p-Diphenethylbenzene-α,α',β,β'-tetracarboxamide

About 25 grams of α,α',β,β'-tetracyano-p-diphenethylbenzene is dissolved in 500 ml. of 90% sulfuric acid at about 90° C. The mixture is stirred gently until solution is complete and then allowed to stand for approximately 3 hours. The solution is then drowned in an excess (about 5 liters) of water at room temperature to precipitate the p-diphenethylbenzene-α,α',β,β'-tetracarboxamide. The precipitated product is collected by filtration and washed free of acid with additional water.

EXAMPLE 2

*N,N,N',N'-tetramethyl-p-diphenethylbenzene-α,α',β,β'-tetracarboxamide*

About 10 grams of p-diphenethylbenzene-α,α',β,β'-tetracarbonyl chloride (prepared by reacting thionyl chloride and p-diphenethylbenzene-α,α',β,β'-tetracarboxylic acid) is fed into an agitated solution of eight equivalents of methylamine in benzene. When all the acid chloride has been added, the solvent is removed by distillation and the product washed with water to remove amine hydrochloride and dried under reduced pressure.

EXAMPLE 3

*N,N,N',N'-octamethyl-p-diphenethylbenzene-α,α',β,β'-tetracarboxamide*

This product is made in accordance with the procedure of Example 2 using dimethylamine in place of methylamine.

EXAMPLE 4

*N,N,N',N'-tetra(2-ethylhexyl)-p-diphenethylbenzene-α,α',β,β'-tetracarboxamide*

This product is made in accordance with the procedure of Example 2 using 2-ethylhexylamine in place of methylamine.

EXAMPLE 5

*N,N,N',N'-tetracyclohexyl-p-diphenethylbenzene-α,α',β,β'-tetracarboxamide*

This product is made in accordance with the procedure of Example 2 using cyclohexylamine in place of methylamine.

EXAMPLE 6

*N,N,N',N'-tetrabenzyl-p-diphenethylbenzene-α,α',β,β'-tetracarboxamide*

This product is made in accordance with the procedure of Example 2 using benzylamine in place of methylamine.

EXAMPLE 7

*N,N,N',N'-tetraxylyl-p-diphenethylbenzene-α,α',β,β'-tetracarboxamide*

This product is made in accordance with the procedure of Example 2 using xylidine in place of methylamine.

The compounds produced in accordance with the present invention are crystalline compounds of moderate molecular weight. They are insoluble in water, but readily soluble in a variety of commercially available solvents. They are of particular value as resin intermediates, and also as (intermediates in the preparation of) plasticizers, flame proofing agents, gear oil additives, high temperature grease additives, fungicides and in numerous other industrial applications. In addition, a number of the compounds under consideration exhibit bacteriostatic properties. These products are also valuable since they present a series of compounds in which the melting point can be varied while the chemical characteristics are maintained substantially constant. High melting products are obtained by using the para form of benzene diacetonitrile as the starting material, whereas the ortho and meta benzene diacetonitriles yield lower melting products.

The tetraamides of the present invention are valuable plasticizers for polyvinyl chloride resins and nitrogeneous resins such as polyacrylonitriles and polyamides, and their good dielectric characteristics render them useful per se as insulators in electrical devices.

Numerous modifications and additional compounds will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive propery or privilege is claimed are defined as follows:

1. A diphenethylbenzene-α,α',β,β'-tetracarboxamide of the formula

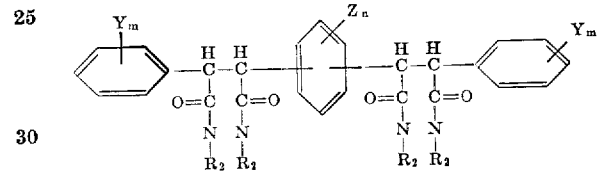

wherein R is selected from the group consisting of alkyl, alkenyl, cycloalkyl, monocarbocyclic aryl and monocarbocyclic aralkyl each having from one to 18 carbon atoms and hydrogen, Y is a monovalent substituent selected from the group consisting of alkyl, monocyclic aryl, aryloxy and alkoxy each having up to 18 carbon atoms, nitro and halogen, Z is a monovalent substituent selected from the group consisting of methyl, and halogen, $m$ is a cardinal number from 0 to 5 inclusive and $n$ is a cardinal number from 0 to 4 inclusive.

2. A compound according to claim 1 which is p-diphenethylbenzene-α,α',β,β'-tetracarboxamide.

3. A compound according to claim 1 which is N,N,N',N' - tetramethyl - p - diphenethylbenzene - α,α',β,β' - tetracarboxamide.

No references cited.

JOHN D. RANDOLPH, *Primary Examiner.*

WALTER A. MODANCE, *Examiner.*

NATALIE TROUSOF, *Assistant Examiner.*